(12) United States Patent  (10) Patent No.: US 8,708,112 B2
Maisonneuve  (45) Date of Patent: Apr. 29, 2014

(54) INERTIAL BRAKING SYSTEM FOR A TRAILER

(76) Inventor: Eric Maisonneuve, St-Amable (CA)

( * ) Notice: Subject to any disclaimer, the term of this patent is extended or adjusted under 35 U.S.C. 154(b) by 148 days.

(21) Appl. No.: 13/446,815

(22) Filed: Apr. 13, 2012

(65) Prior Publication Data

US 2012/0261900 A1    Oct. 18, 2012

(30) Foreign Application Priority Data

Apr. 13, 2011  (GB) .................................. 1106272.6

(51) Int. Cl.
*B60T 7/20* (2006.01)
*B60D 1/24* (2006.01)

(52) U.S. Cl.
CPC .. *B60T 7/20* (2013.01); *B60D 1/242* (2013.01)
USPC ...................... 188/112 R; 280/432; 280/491.5

(58) Field of Classification Search
CPC .......................................................... B60T 7/20
USPC .............................. 280/432, 491.5; 188/112 R
See application file for complete search history.

(56) References Cited

U.S. PATENT DOCUMENTS

| | | | |
|---|---|---|---|
| 2,856,036 A | 10/1958 | Mullen | |
| 2,921,652 A * | 1/1960 | Smith | 188/112 R |
| 3,144,101 A * | 8/1964 | Hahn | 188/112 R |
| 3,180,455 A * | 4/1965 | De Puydt et al. | 188/112 R |
| 3,647,032 A * | 3/1972 | Dombeck | 188/112 R |
| 3,909,075 A | 9/1975 | Pittel, Jr. et al. | |
| 3,955,652 A | 5/1976 | Nilsson et al. | |
| 3,967,863 A | 7/1976 | Tomecek et al. | |
| 4,196,936 A | 4/1980 | Snyder | |
| 5,149,121 A | 9/1992 | Hafner | |
| 5,246,243 A * | 9/1993 | Carr | 280/428 |
| 6,012,780 A | 1/2000 | Duvernay | |
| 6,386,337 B2 * | 5/2002 | Pribula et al. | 188/112 R |
| 7,253,721 B2 | 8/2007 | Flohr et al. | |
| 7,806,240 B2 * | 10/2010 | Walstrom et al. | 188/112 R |

FOREIGN PATENT DOCUMENTS

| | | |
|---|---|---|
| EP | 1612081 | 1/2006 |
| GB | 1301826 | 1/1973 |
| WO | WO2008124073 | 10/2008 |

* cited by examiner

*Primary Examiner* — Kevin Hurley

(57) ABSTRACT

An inertial braking system for a trailer has an elongated casing member defining an axis along its elongated length, and having an opening at one end of the elongated length. A movable plate housed within the casing and including at least one opening adapted to allow light to pass therethrough. A piston member including a pad member at a distal end thereof and placed inside of the one end of the casing member with the pad member facing outwards from the interior of the casing member and adapted to move along the axis, and rigidly connected at an opposite end to an adjacent end of the movable plate.

20 Claims, 3 Drawing Sheets

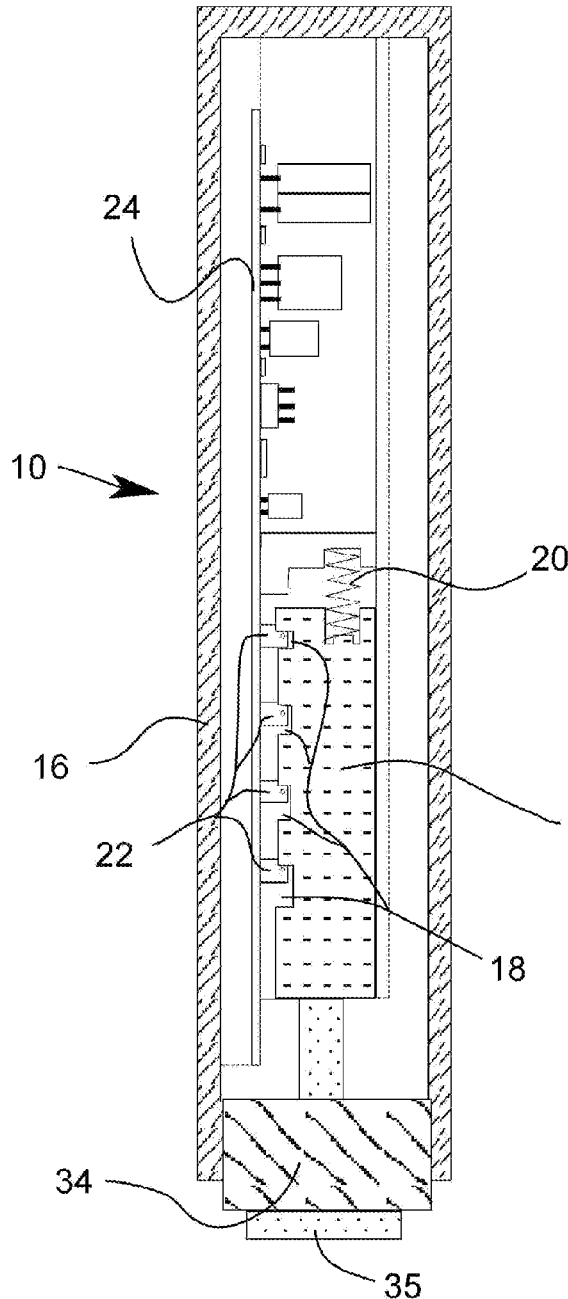
FIG. 2a
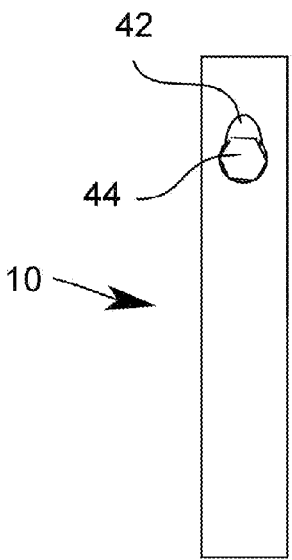
FIG. 2b
FIG. 2c

INERTIAL BRAKING SYSTEM FOR A TRAILER

This application claims priority based on request GB1106272.6 filed Apr. 13, 2011

FIELD OF THE INVENTION

The present invention relates generally to braking systems but more particularly to an inertial braking system for a trailer.

BACKGROUND OF THE INVENTION

Some types of hitched trailers don't have any braking system while others have a braking system that is inadequate. The problem to be solved is that a trailer can sometimes be much heavier than the towing vehicle and its inertia can overtake the towing vehicle. There is therefore a need for improvement.

SUMMARY OF THE INVENTION

In view of the foregoing disadvantages inherent in the known devices now present in the prior art, the present invention, which will be described subsequently in greater detail, is to provide objects and advantages which are:

It is a main advantage of this invention to provide for a trailer braking system using the force of inertia as the actuating means.

In order to do so, the invention consists in an elongated casing member defining an axis along its elongated length, and having an opening at one end of the elongated length. A movable plate housed within the casing and including at least one opening adapted to allow light to pass therethrough.

A piston member including a pad member at a distal end thereof and placed inside of the one end of the casing member with the pad member facing outwards from the interior of the casing member and adapted to move along the axis, and rigidly connected at an opposite end to an adjacent end of the movable plate.

A circuit board rigidly connected within the casing and including at least one opto-coupler positioned such that the at least one opening in the movable plate is aligned with a light beam produced by the at least one opto-coupler and allows the light beam to pass therethrough.

A biasing member positioned between the movable plate and a portion of the interior wall of the casing member, such that when the braking system controller is in a static state the light beam passes through the at least one opening, and when the piston member is pushed inwardly the movable plate moves with it, thereby moving the at least one opening along the axis and thereby blocking the light beam resulting in a pulse width modulation signal proportional to the number of opto-couplers having their light paths broken. That pulse width modulation signal determines the electrical current applied to the at least one coil which translates into proportional power adapted to be sent to the braking members of the trailer member.

In a preferred embodiment, the inertial braking system controller has the movable plate include a plurality of openings. The circuit board includes a plurality of opto-couplers equal to the number of the openings, such that each respective opening in the movable plate is aligned with a light beam produced by each respective opto-coupler and thereby allows the light beams to pass through unobstructed. At least one opto-coupler includes one LED member and one photo-sensor, such that a light beam can be produced therebetween.

In a preferred embodiment, the circuit board includes a regulator, a micro-controller that generates a pulse width modulation, a power semi-conductor device, wherein the pulse width modulation is fed into the power semi-conductor device, which sends an electric signal to the at least one coil member, which is adapted to actuate the braking members.

In yet another preferred embodiment, there are a plurality of coil members.

The inertial braking system controller has the biasing means provides recoil to the movable plate.

In a preferred embodiment an inertial braking system comprising of at least one braking member adapted to be placed upon and used on a trailer member, and an inertial braking system controller comprising an elongated casing member defining an axis along its elongated length, and having an opening at one end of the elongated length.

A movable plate housed within the casing and including at least one opening adapted to allow light to pass therethrough. A piston member including a pad member at a distal end thereof and placed inside of the one end of the casing member with the pad member facing outwards from the interior of the casing member and adapted to move along the axis, and rigidly connected at an opposite end to an adjacent end of the movable plate.

A circuit board rigidly connected within the casing and including at least one opto-coupler positioned such that the at least one opening in the movable plate is aligned with a light beam produced by the at least one opto-coupter and allowing the light beam to pass therethrough.

The circuit board further including at least one coil member adapted to send power to the at least one braking member, and electronic circuit members connected between the at least one-coupler and the at least one coil member adapted to control the at least one coil member, and a biasing member positioned between the movable plate and a portion of the interior wall of the casing member, such that when the braking system controller is in a static state the light beam passes through the at least one opening, and when the piston member is pushed inwardly the movable plate moves with it, thereby moving the at least one opening along the axis and thereby blocking the light beam resulting in an electronic signal being produced by the electronic circuit members to be sent to the at least one coil member, which thereby produces power to be sent to the at least one braking member.

A combination of a trailer member and an inertial braking system, the combination comprising a trailer member having at least one wheel member, and an inertial braking system comprising of at least one braking member placed upon and used on the wheel member, and an inertial braking system controller comprising an elongated casing member defining an axis along its elongated length, and having an opening at one end of the elongated length.

A movable plate housed within the casing and including at least one opening adapted to allow light to pass therethrough. A piston member including a pad member at a distal end thereof and placed inside of the one end of the casing member with the pad member facing outwards from the interior of the casing member and adapted to move along the axis, and rigidly connected at an opposite end to an adjacent end of the movable plate.

A circuit board rigidly connected within the casing and including at least one opto-coupler positioned such that the at least one opening in the movable plate is aligned with a light beam produced by the at least one opto-coupler and allows the light beam to pass therethrough.

The circuit board further including at least one coil member adapted to send power to the at least one braking member, and electronic circuit members connected between the at least one-coupler and the at least one coil member adapted to control the at least one coil member, and a biasing member positioned between the movable plate and a portion of the interior wall of the casing member, such that when the braking system controller is in a static state the light beam passes through the at least one opening, and when the piston member is pushed inwardly the movable plate moves with it, thereby moving the at least one opening along the axis and thereby blocking the light beam resulting in an electronic signal being produced by the electronic circuit members to be sent to the at least one coil member, which thereby produces power which is sent to the at least one braking member, which then slows the rotation of the at least one wheel member of the trailer, which in turns slows down the trailer member.

The combination wherein the trailer member includes a trailer hitch frame, wherein the casing member is connected to the hitch frame such that they are adapted to slide with respect to one another in the same direction as the axis of the casing member, in order to allow the piston member to be compressed and released, thereby triggering the at least one braking member.

In a preferred embodiment, in the combination, the casing member includes a plurality of elliptically shaped holes and the hitch frame includes an equal number of bolts adapted to fit and slide within the holes, thereby providing a sliding connection between the casing member and the hitch frame.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIGS. 2a-b Cutaway side view and side view of the invention.

FIG. 2c Top view of the movable plate with photo-sensors.

DETAILED DESCRIPTION OF THE PREFERRED EMBODIMENT

Figure 1A:
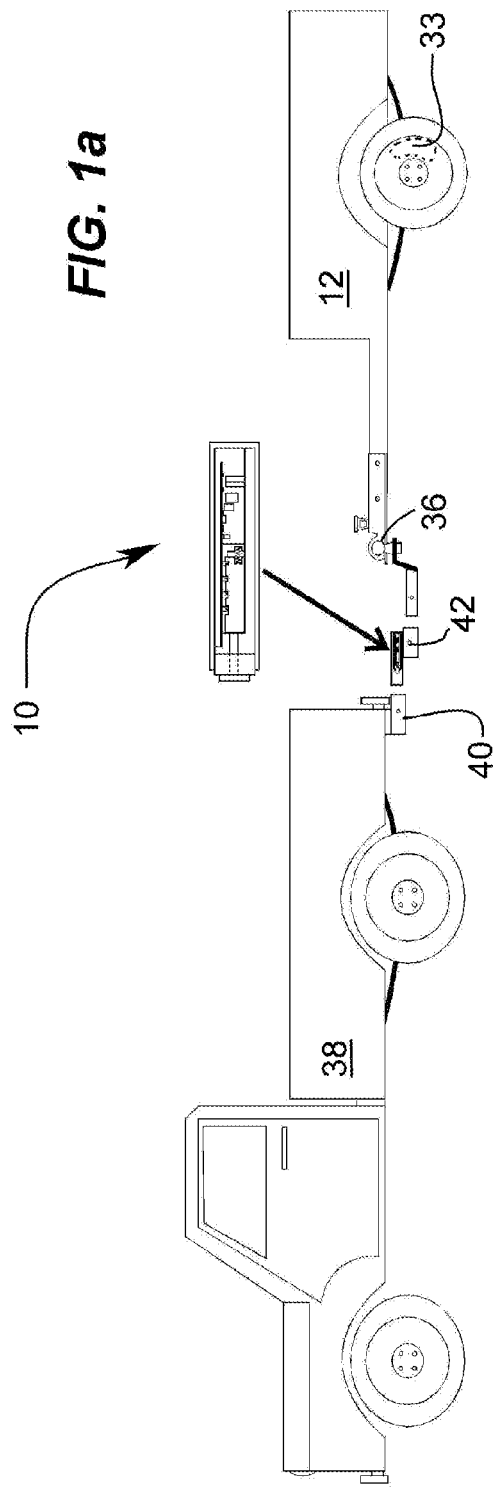
FIGS. 1a-b Side elevations of two variants of the invention seen in context.
Figure 1B:
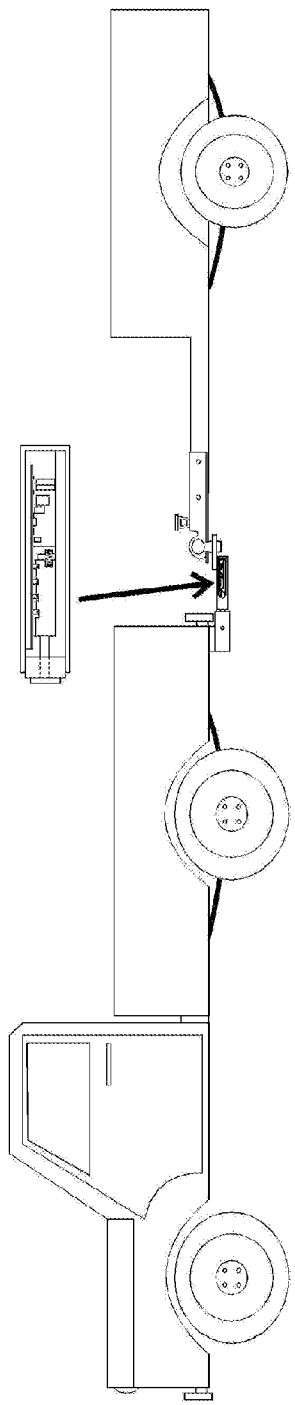
Figure 3:
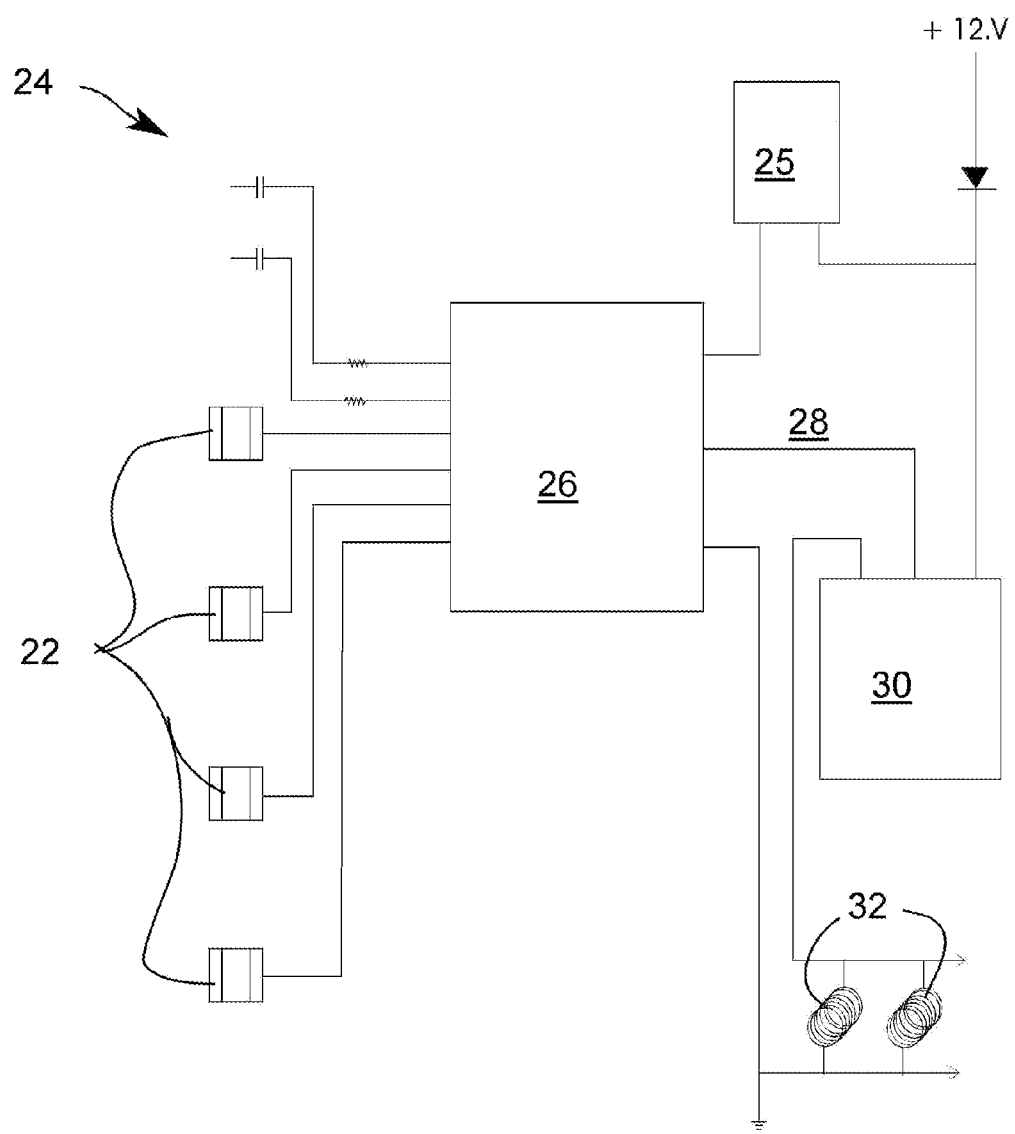
FIG. 3 Schematic view of the electronic circuit.

An inertial braking system controller (10) for a trailer (12) has a movable plate (14) located withing an elongate casing member (16). The movable plate (14) has a plurality of openings (18) for passing light from LEDs (19) located on one side of the movable plate (14) to photo-sensors (21) located on the other side of the movable plate (14). The LEDs and photo-sensors for a unit known as opto-couplers (22). The opto-couplers (22) control the electric current running through an electronic circuit board (24), which is comprised of a regulator (25), and a micro controller (26), which generates a pulse width modulation (PWM) (28) fed into a power semi-conductor device (30). The electric signal from the power semi-conductor device (30) is what actuates the coils (32) which actuate the brakes (not shown).

A biasing means (20) provides recoil to the movable perforated plate (14) as it moves following accelerations and decelerations.

When the trailer (12) is decelerating, it compresses a pad (35) and a piston member (34) because inertia makes it decelerate after the towing vehicle (25) does. Compressing the piston (34) pushes the movable plate (14) which obstructs the light path of the opto-couplers (22). Each opening (18) has a different size, that is, they get progressively longer, so that the more the movable plate (14) is moved the more openings (18) are out of one of the opto-couplers (22) so that additional light paths are blocked which translates into additional electrical current in the form of a pulse width modulation sent to the coil (32) because the electrical current strength sent to the coil (32) is proportional to the number of opto-couplers (22) having their light paths broken. The pulse width modulation signal strength translates into a proportional power sent to the brake member (33) of the trailer member (12).

The braking system (10) is typically installed where a hitch ball member (36) is usually installed and as such, acts as an interface between a trailer hitch frame member (40) and the hitch ball member (36). The casing (16) is bolted the hitch frame member (40) in such a way as to be slidingly connected in order to allow for the piston (34) to be compressed. For example, one way to provide a sliding connection could be to have elliptically shaped nut holes (42), one on each side of the casing (16), so that at least one nut and bolt combination (44) can slide along a short course within the nut holes (42).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, failing within the scope of the invention.

The invention claimed is:

1. An inertial braking system controller comprising an elongated casing member defining an axis along its elongated length, and having an opening at one end of said elongated length; a movable plate housed within said casing and including at least one opening adapted to allow light to pass therethrough; a piston member including a pad member at a distal end thereof and placed inside of said one end of said casing member with said pad member facing outwards from the interior of said casing member and adapted to move along said axis, and is rigidly connected at an opposite end to an adjacent end of said movable plate; an electronic circuit board rigidly connected within said casing and including at least one opto-coupler positioned such that said at least one opening in said movable plate is aligned with a light beam produced by said at least one opto-coupler and allows said light beam to pass therethrough, and a biasing member positioned between said movable plate and a portion of the interior wall of said casing member, such that when said braking system controller is in a static state said light beam passes through said at least one opening, and when said piston member is pushed inwardly said movable plate moves with it, thereby moving said at least one opening along said axis and thereby blocking said light beam resulting in an electronic signal being produced by said electronic circuit board to be sent to said at least one coil member, which thereby produces power adapted to be sent to braking members of trailer member.

2. The inertial braking system controller of claim 1, wherein said movable plate includes a plurality of openings; and wherein said circuit board includes a plurality of opto-couplers equal to the number of said openings, such that each respective opening in said movable plate is aligned with a light beam produced by each respective opto-coupler and thereby allows said light beams to pass through unobstructed, and wherein each opening has a different size so that the more said movable plate is moved the more openings are out of line of said opto-couplers so that additional light paths are blocked and additonal voltage is sent to said at least one coil.

3. The inertial braking system controller of claim 1, wherein said at least one opto-coupler includes one LED member and one photo-sensor, such that a light beam can be produced therebetween.

4. The inertial braking system controller of claim 1, wherein said circuit board includes a regulator, a micro-controller that generates a pulse width modulation, a power semi-conductor device, wherein said pulse width modulation is fed into said power semi-conductor device, which sends an electric signal to said at least one coil member, which is adapted to actuate said braking members.

5. The inertial braking system controller of claim 1, wherein there are a plurality of coil members.

6. The inertial braking system controller of claim 1, wherein said biasing means provides recoil to said movable plate.

7. An inertial braking system comprising of at least one braking member adapted to be placed upon and used on a trailer member; and an inertial braking system controller comprising an elongated casing member defining an axis along its elongated length, and having an opening at one end of said elongated length; a movable plate housed within said casing and including at least one opening adapted to allow light to pass therethrough; a piston member including a pad member at a distal end thereof and placed inside of said one end of said casing member with said pad member facing outwards from the interior of said casing member and adapted to move along said axis, and is rigidly connected at an opposite end to an adjacent end of said movable plate; a circuit board rigidly connected within said casing and including at least one opto-coupler positioned such that said at least one opening in said movable plate is aligned with a light beam produced by said at least one opto-coupler and allows said light beam to pass therethrough, and a biasing member positioned between said movable plate and a portion of the interior wall of said casing member, such that when said braking system controller is in a static state said light beam passes through said at least one opening, and when said piston member is pushed inwardly said movable plate moves with it, thereby moving said at least one opening along said axis and thereby blocking said light beam resulting in an electronic signal being produced by said electronic circuit board to be sent to said at least one coil member, which thereby produces power to be sent to said at least one braking member.

8. The inertial braking system of claim 7, wherein said movable plate includes a plurality of openings; and wherein said circuit board includes a plurality of opto-couplers equal to the number of said openings, such that each respective opening in said movable plate is aligned with a light beam produced by each respective opto-coupler and thereby allows said light beams to pass through unobstructed, and wherein each opening has a different size so that the more said movable plate is moved the more openings are out of line of said opto-couplers so that additional light paths are blocked and additional voltage is sent to said at least one coil.

9. The inertial braking system of claim 7, wherein said at least one opto-coupler includes one LED member and one photo-sensor, such that a light beam can be produced therebetween.

10. The inertial braking system of claim 7, wherein said circuit board includes a regulator, a micro-controller that generates a pulse width modulation, a power semi-conductor device, wherein said pulse width modulation is fed into said power semi-conductor device, which sends an electric signal to said at least one coil member, which actuates said at least one braking member.

11. The inertial braking system of claim 7, wherein there are a plurality of coil members.

12. The inertial braking system of claim 7, wherein said biasing means provides recoil to said movable plate.

13. A combination of a trailer member and an inertial braking system, said combination comprising a trailer member having at least one wheel member; and an inertial braking system comprising of at least one braking member placed upon and used on said wheel member; and an inertial braking system controller comprising an elongated casing member defining an axis along its elongated length, and having an opening at one end of said elongated length; a movable plate housed within said casing and including at least one opening adapted to allow light to pass therethrough; a piston member including a pad member at a distal end thereof and placed inside of said one end of said casing member with said pad member facing outwards from the interior of said casing member and adapted to move along said axis, and is rigidly connected at an opposite end to an adjacent end of said movable plate; a circuit board rigidly connected within said casing and including at least one opto-coupler positioned such that said at least one opening in said movable plate is aligned with a light beam produced by said at least one opto-coupler and allows said light beam to pass therethrough, said circuit board further including at least one coil member adapted to send power to said at least one braking member, and electronic circuit members connected between said at least one-coupler and said at least one coil member adapted to control said at least one coil member, and a biasing member positioned between said movable plate and a portion of the interior wall of said casing member, such that when said braking system controller is in a static state said light beam passes through said at least one opening, and when said piston member is pushed inwardly said movable plate moves with it, thereby moving said at least one opening along said axis and thereby blocking said light beam resulting in an electronic signal being produced by said electronic circuit board to be sent to said at least one coil member, which thereby produces power which is sent to said at least one braking member, which then slows the rotation of said at least one wheel member of said trailer, which in turns slows down the trailer member.

14. The combination of claim 13, wherein said movable plate includes a plurality of openings; and wherein said circuit board includes a plurality of opto-couplers equal to the number of said openings, such that each respective opening in said movable plate is aligned with a light beam produced by each respective opto-coupler and thereby allows said light beams to pass through unobstructed, and wherein each opening has a different size so that the more said movable plate is moved the more openings are out of line of said opto-couplers so that additional light paths are blocked and additional voltage is sent to said at least one coil.

15. The combination of claim 13, wherein said at least one opto-coupler includes one LED member and one photo-sensor, such that a light beam can be produced therebetween.

16. The combination of claim 13, wherein said circuit board includes a regulator, a micro-controller that generates a pulse width modulation, a power semi-conductor device, wherein said pulse width modulation is fed into said power semi-conductor device, which sends an electric signal to said at least one coil member, which actuates said at least one braking member.

17. The combination of claim 13, wherein there are a plurality of coil members.

18. The combination of claim 13, wherein said biasing means provides recoil to said movable plate.

19. The combination of claim 13, wherein said trailer member includes a trailer hitch frame, wherein said casing member is connected to said hitch frame such that they are adapted to slide with respect to one another in the same direction as said axis of said casing member, in order to allow the piston member to be compressed and released, thereby triggering said at least one braking member.

20. The combination of claim 19, wherein said casing member includes a plurality of elliptically shaped holes; and said hitch frame includes an equal number of bolts adapted to fit and slide within said holes, thereby providing a sliding connection between said casing member and said hitch frame.

* * * * *